United States Patent
Kougiouris et al.

(10) Patent No.: US 8,661,505 B2
(45) Date of Patent: Feb. 25, 2014

(54) POLICY EVALUATION IN CONTROLLED ENVIRONMENT

(71) Applicant: Juniper Networks, Inc., Sunnyvale, CA (US)

(72) Inventors: Panagiotis Kougiouris, Cupertino, CA (US); Roger Chickering, Granite Bay, CA (US); Paul James Kirner, Palo Alto, CA (US); Stephen R. Hanna, Brighton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/728,173

(22) Filed: Dec. 27, 2012

(65) Prior Publication Data

US 2013/0145421 A1    Jun. 6, 2013

Related U.S. Application Data

(63) Continuation of application No. 11/465,263, filed on Aug. 17, 2006, now Pat. No. 8,352,998.

(51) Int. Cl.
*H04L 29/06* (2006.01)

(52) U.S. Cl.
CPC .................................. *H04L 63/20* (2013.01)
USPC .................................................. 726/1; 726/4

(58) Field of Classification Search
USPC ............. 726/4, 26, 1; 713/401, 182, 170, 161
See application file for complete search history.

(56) References Cited

U.S. PATENT DOCUMENTS

| | | | |
|---|---|---|---|
| 8,352,998 B1 | 1/2013 | Kougiouris et al. | |
| 2004/0044628 A1* | 3/2004 | Mathew et al. | 705/51 |
| 2004/0078572 A1* | 4/2004 | Pearson et al. | 713/170 |
| 2005/0005129 A1* | 1/2005 | Oliphant | 713/182 |
| 2005/0063400 A1* | 3/2005 | Lum | 370/401 |
| 2005/0125687 A1* | 6/2005 | Townsend et al. | 713/200 |
| 2005/0138417 A1* | 6/2005 | McNerney et al. | 713/201 |
| 2006/0200458 A1* | 9/2006 | Sankar | 707/4 |
| 2007/0150934 A1* | 6/2007 | Fiszman et al. | 726/1 |

* cited by examiner

*Primary Examiner* — William Goodchild
*Assistant Examiner* — Nega Woldemariam
(74) *Attorney, Agent, or Firm* — Harrity & Harrity, LLP

(57) ABSTRACT

A module may include interface logic to receive information identifying a state related to a client device via logic related to a controlled environment, and to send a valid policy result to a host device, where the valid policy result is related to the state. The module may include processing logic to process policy content according to a resource policy, where the processing is based on the information, and to produce the valid policy result based on the processing using the resource policy, where the valid policy result is adapted for use by the host device when implementing the network policy with respect to a destination device when the client device attempts to communicate with the destination device.

20 Claims, 9 Drawing Sheets

| | |
|---|---|
| SEM AUTHOR: BOB MARLEY | 500 |
| DATE: | JUNE 1, 2006 |
| SEM ID: | FINANCE_POLICY |
| SPACE: | 5.1 MEGABYTES |
| CONNECTIONS: | PORT 001 |
| | VLAN-7 |
| | FINANCE |
| CPU REQUIREMENTS: | 90% |
| DEST. DIRECTORY | C:\SEM-DATA |
| OPERATOR FIELD | |

POLICY EVALUATION IN CONTROLLED ENVIRONMENT

RELATED APPLICATION

This application is a continuation of U.S. patent application Ser. No. 11/465,263, filed Aug. 17, 2006 (now U.S. Pat. No. 8,352,998), the entire content of which is hereby incorporated by reference.

FIELD OF THE INVENTION

Implementations consistent with principles of the invention relate generally to computer and data communications and more particularly, to techniques for evaluating aspects of network policies.

BACKGROUND OF THE INVENTION

Modern data networks may allow a client device to access one or more resources on a network. In certain situations, a client device may attempt to access sensitive resources, such as resources on a corporate network. For example, a client device may attempt to access a file server containing corporate financial data, such as sales records for a company.

Operators of networks may wish to restrict network access unless devices meet certain requirements. For example, a network operator may not want client devices accessing financial data unless the client belongs to a certain finance group. In another example, a network operator many want to allow peer-to-peer instant messaging communication initiated only from devices protected with antivirus software and running personal firewall software. The network operator may wish to use a number of different network policies to control access to a number of different resources on a network. Implementing a number of network policies may cause network administration and network policy enforcement to become very complex. As a result, the network operator may not be able to implement a desired number of policies in the network. Failure to implement adequate network policies may allow a client device to access resources that the client device should not be able to access.

SUMMARY OF THE INVENTION

In accordance with an aspect, a device is provided. The device may include first logic to receive information intended for a module, where the information is related to a state of a source device, receive a result from the module, where the result indicates whether the state of the source device complies with the policy, and determine whether the result is a valid result, where the valid result indicates that the module is operating in a predicted manner. The device may include second logic to receive the result from the first logic when the result is a valid result, and send an enforcement instruction to a destination device configured to implement the policy with respect to the source device based on the instruction when the result indicates that the state of the source device complies with the policy.

In accordance with another aspect, a network device is provided. The network device may include an interface to receive instructions related to approved network policies determined by a server with respect to a network resource, where the instructions are related to policy results produced by a module operating in a controlled environment on the server, where the controlled environment is configured to allow the approved network policies to be used by the server with respect to the network device, and where the controlled environment is configured to terminate processing by the module when the module performs an operation related to unapproved module operations. The network device may receive a message from an endpoint, where the message is intended for the network resource, and forward the message to the network resource when the endpoint complies with the approved network policies.

In accordance with yet another aspect, a module is provided. The module may include interface logic to receive information identifying a state related to a client device via logic related to a controlled environment, and to send a valid policy result to a host device, where the valid policy result is related to the state. The module may include processing logic to process policy content according to a resource policy, where the processing is based on the information, and to produce the valid policy result based on the processing using the resource policy, where the valid policy result is adapted for use by the host device when implementing the network policy with respect to a destination device when the client device attempts to communicate with the destination device.

In accordance with still another aspect, a method is provided. The method may include sending policy information to a module operating in a controlled environment and receiving policy results from the module via the controlled environment when the controlled environment identifies that the module operates within a predefined behavior. The method may include sending an enforcement instruction to a network device based on the policy results, where the enforcement instruction causes the network device to allow a source device to access a resource when the source device complies with one or more policies related to the policy information.

In accordance with yet another aspect, a client device is provided. The client device may receive a request for client device information from a server on behalf of a software evaluation module operating in a controlled environment according to a software evaluation module policy, where the client device information is used by the software evaluation module to perform an operation on behalf of the client device, and may provide the client device information to the software evaluation module. The client device may receive information about a compliance of the client device, where the compliance is determined by the software evaluation module using client device information when the software evaluation module operates in accordance with the software module policy.

In accordance with still another aspect, a computer readable medium that stores instructions executable by a processing device is provided. The computer readable medium may include instructions for initializing a controlled environment adapted to allow one or more software evaluation modules to operate therein while performing pre-determined operations, instructions for receiving policy information via the controlled environment, instructions for retrieving a plurality of policies based on the policy information, instructions for determining whether a device complies with certain of the plurality of policies, instructions for producing policy results based on the determining, instructions for sending the policy results to a host device for use with a policy decision point when the policy results are valid policy results, and instructions for preventing the policy results from reaching a destination using the controlled environment when the policy results are not valid policy results.

In accordance with yet another aspect, a device is provided. The device may include means for initializing a controlled environment, means for receiving status information from a source device via a first network, where the status information is adapted for use in the controlled environment, and means for sending the status information and policy information to a module operating in the controlled environment. The device may include means for receiving a plurality of policy results related to a plurality of policies from the module when the module operates according to a module policy, means for receiving an error message from the controlled environment when the module does not operate according to the module policy, and means for sending policy enforcement instructions to a network device configured to allow the source device to communicate with a protected device via a second network when the module operates according to the module policy and the source device complies with at least a subset of the plurality of valid policies.

In accordance with still another aspect, a system is provided. The system may include a module operating in a controlled environment according to a module policy, the module configured to retrieve information related to a plurality of policies pertaining to a device. The module may retrieve at least a subset of the policies based on the information, determine a compliance of the device using the at least a subset of the policies, and generate policy results representing the compliance of the device with respect to determined criteria based on the determining. The module may send the policy results to a destination when the module operates according to a module policy, where the policy results are used to allow the device to perform an operation, and may receive a termination instruction from the controlled environment when the module does not operate according to the module policy.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 5 illustrates an exemplary data structure for storing a manifest consistent with principles of the invention;

DETAILED DESCRIPTION

Figure 1:
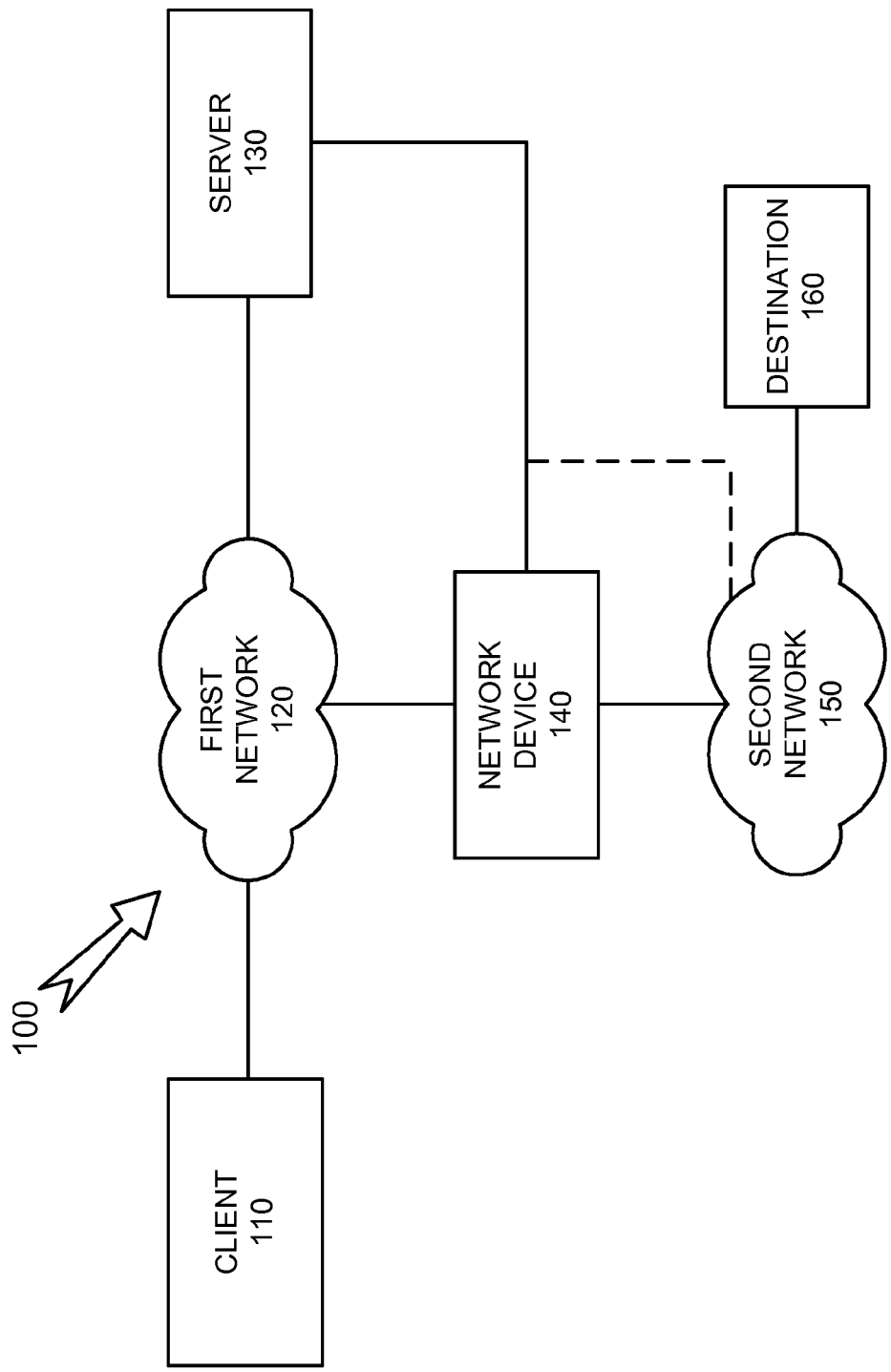
FIG. 1 illustrates an exemplary system that can be configured to operate in accordance with principles of the invention.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may include a server operating as a policy decision point to make determinations with respect to one or more network policies that can be implemented with respect to one or more client devices, or endpoints. "Policy," as used herein, refers to any set of rules or instructions that can be used to alter the operation of a device or network. For example, a policy can be used to prevent a device from accessing other devices unless the device complies with the policy. Implementations of the server may evaluate network policies using a controlled environment that does not expose the server and/or other devices on a network to the effects of the code that implements the evaluations when the code might harm the host system (e.g., the server), other devices on the network, or where the code might interfere with normal network operation.

In one implementation, the server may use modules to perform operations related to network policies. The server may use resource policies to control the operation of the modules while the modules perform network policy related operations. A system administrator and/or the server itself may create a controlled environment on the server that is used to execute modules performing network policy related operations, such as determining whether a client device complies with a network policy. The server may be configured to run the controlled environment whenever the server is operating with network traffic, or the server may be configured to selectively turn the controlled environment on or off as needed. The controlled environment may allow modules to operate so long as the modules operate according to pre-determined criteria (i.e., operate in an anticipated manner).

In an implementation, a server may use plug-in modules, referred to as server evaluation modules (SEMs), to perform processing operations with respect to the one or more network policies. The server may send policy information for a number of policies to the SEM. The SEM may perform processing with respect to policies based on the policy information. SEMs may also perform processing based on configuration and runtime status information received from a device (e.g., a client device) being evaluated. The SEM may return a list of policy compliance results to the server and/or may perform other operations, such as writing information to memory, modifying a system file, etc.

The server may run the SEM within the controlled environment according to one or more resource policies in a way that allows devices, such as the client device, and/or other software applications, such as an application program interface (API), to communicate with the SEM as if the controlled environment were not present. Resource policies used with SEMs may be referred to as SEM policies. For example, the controlled environment may allow the SEM to receive client requests and to produce results, such as policy results, when the SEM operates according to a SEM policy. The controlled environment may be configured to prevent the SEM from performing operations that can interfere with the operation of the server and/or that may have undesirable and/or unexpected consequences. For example, the controlled environment may trap module instructions that would overwrite a system file on the server; in addition, the controlled environment may terminate operation of the offending SEM. As used herein, "trap," and its derivatives, refers to an operation that can be used to prevent one device or module from performing an action that impacts another device or module.

Resources in the server (e.g., the SEM) may be configured to operate according to one or more SEM policies that allow the resources to perform operations, such as accessing memory, using CPU cycles, exchanging data with other components in the server, etc. The controlled environment may be configured to allow the SEMs in the server to operate freely so long as the SEMs do not attempt to perform operations outside the SEM policy (i.e., operations that violate a resource policy). The controlled environment may terminate a SEM when the SEM attempts to perform an operation outside the resource (SEM) policy.

Assume, for the sake of example, that the controlled environment may let one or more SEMs operate in an operational environment, e.g., on a network, until one of the SEMs attempts to perform an improper operation. The controlled environment may be configured to allow SEMs to operate on live traffic and to produce policy results for use in the network as long as the SEMs operate in a desired manner, e.g., within a resource policy for the SEMs. The controlled environment may further be configured to terminate SEMs that do not operate within the resource policy. The controlled environment may send an error message to the server or to a device that made a request related to the improper operation.

Implementations described herein may evaluate policies with respect to substantially any number of client devices, servers, server evaluation modules and/or network devices. Controlled environments may further be configured to evaluate multiple policies at substantially the same time (e.g., in parallel) and/or to evaluate policies in a serial fashion (e.g., one at a time). In addition, implementations of the controlled environment may be adapted to work on non-networked devices, such as standalone devices.

Exemplary System

FIG. 1 illustrates an exemplary system 100 that can be configured to operate in accordance with principles of the invention. System 100 may include a client 110, a first network 120, a server 130, a network device 140, a second network 150, and a destination 160.

Client 110 may include a device capable of making a data unit available to a network. "Data unit," as used herein, may refer to any type of machine-readable data having substantially any format that may be adapted for use in one or more networks, such as first network 120 and/or second network 150. A data unit may include packet data and/or non-packet data. Client 110 may include a computer, such as a desktop computer, a laptop computer, a client, a server, a personal digital assistant (PDA), a web-enabled cellular telephone, or another computation or communication device. In one implementation, client 110 may operate as a client device, or endpoint, and may attempt to access resources associated with a second network 150, such as destination 160.

First network 120 may include any network capable of transferring a data unit. Implementations of first network 120 may include local area networks (LANs), metropolitan area networks (MANs) and/or wide area networks (WANs), such as the Internet, that may operate using substantially any network protocol, such as Internet protocol (IP), asynchronous transfer mode (ATM), and/or synchronous optical network (SONET).

First network 120 may include network devices, such as routers, switches, firewalls, and/or servers (not shown). First network 120 may be a hardwired network using wired conductors and/or optical fibers and/or may be a wireless network using free-space optical and/or radio frequency (RF) transmission paths. In one implementation, first network 120 may be a substantially open public network, such as the Internet. In another implementation, first network 120 may be a more restricted network, such as a corporate LAN. Implementations of networks and/or devices operating on networks described herein are not limited to any particular data type, and/or protocol.

Server 130 may include a device capable of receiving a data unit from, and transmitting a data unit to, another device and/or network. For example, server 130 may include one or more server devices/computers, a workstation, desktop computer, laptop computer, PDA, web enabled cellular telephone, Wi-Fi device, or another type of device. In one implementation, server 130 may provide a service to other devices in system 100, such as client 110 and/or destination 160. Server 130 may be configured to operate as an endpoint integrity server (also referred to as a policy decision point) and may use one or more plug-in modules, such as SEMs, to implement substantially any number of network policies in system 100. Implementations of server 130 may be configured with evaluation logic to implement a controlled environment in which substantially any number of SEMs can be run to evaluate their operational characteristics.

Implementations of server 130 may be configured to run the controlled environment whenever server 130 operates with network traffic and/or the controlled environment may be turned on or off as needed to evaluate the operation of SEMs operating with server 130. The controlled environment may be further configured to allow SEMs to operate within resource policies related to the SEMs and may terminate SEMs that attempt to perform operations that are not within the resource policies. In an implementation, server 130 may implement the controlled environment via a Java virtual machine, VMWare based machine, and/or Xen based machine. Other implementations of the controlled environment may be implemented via other techniques.

Network device 140 may include a device capable of receiving a data unit via a network. In one implementation, network device 140 may include an in-line device operating as an edge device between a first network and a destination device that may be operating on a second network. For example, network device 140 may operate as an edge device between an untrusted network, such as the Internet (e.g., first network 120), and a trusted network, such as a corporate LAN (e.g., second network 150). "Inline network device" may refer to any network device operating in a manner whereby all, or substantially all, data units intended for a destination device pass through the network device before reaching the destination device.

Network device 140 may include one or more devices such as routers, gateways, firewalls, switches, and/or servers. For example, network device 140 may operate as a router in cooperation with server 130 to provide communication services to a number of subscribers, such as client 110 and/or destination 160. In one implementation, server 130 and/or a network device may operate as a policy enforcement point and may determine whether client 110 complies with one or more network policies, such as network policies for second network 150. Server 130 may communicate network policy information, such as policy enforcement instructions, to network device 140. Network device 140 may operate as a policy enforcement point on behalf of server 130 by allowing client 110 to access resources on second network 150 when client 110 is authorized to do so according to one or more network policies administered by server 130.

Second network 150 may include any network capable of transporting a data unit. Second network 150 may be a restricted network such as a LAN associated with a corporation. For example, second network 150 may be a sub-network operating within first network 120 or may be a separate network that may be accessed via a first network 120 and other devices. Second network 150 may be configured so that all, or substantially all, data units intended for a device operating on second network 150 pass through network device 140. For example, network device 140 may operate to prevent data units from reaching a protected device, such as destination device 160, unless a sending device is authorized to send data units to destination 160 according to one or more network policies administered by server 130.

Destination 160 may include a device capable of making a data unit available to a network or capable of receiving a data unit from a network. Destination 160 may include a computer, such as a desktop computer, a laptop computer, a client, a server, a personal digital assistant (PDA), a web-enabled cellular telephone, or another computation or communication device. Access to destination 160 may be controlled via one or more network policies administered via server 130 and/or enforced by network device 140. A sending device may be allowed to exchange information with destination 160 when the sending device complies with one or more network policies related to destination 160. Implementations of destination device 160 may be configured to operate on second network 150 without having knowledge about network policies administered by server 130 and/or network device 140.

Exemplary Device Architecture

Figure 2:
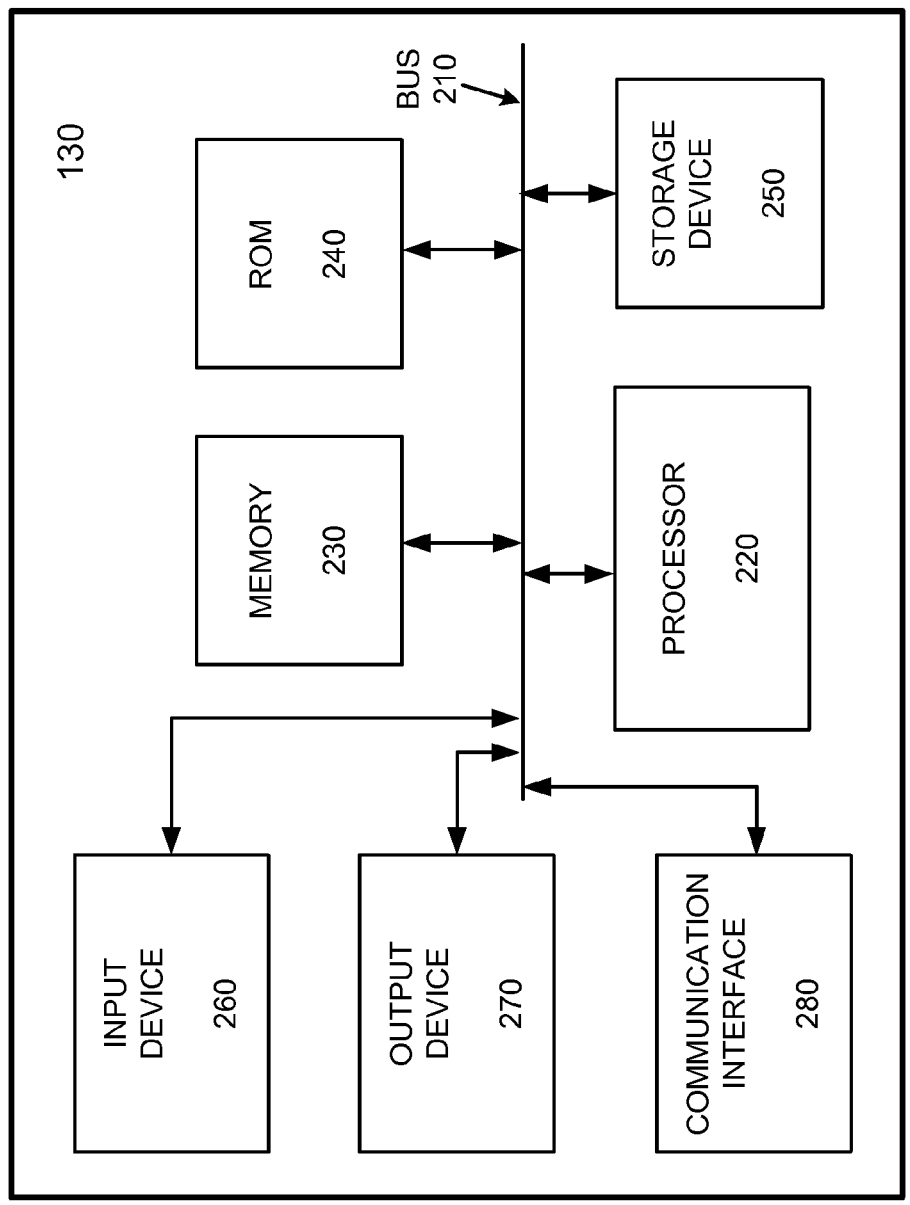
FIG. 2 illustrates an exemplary architecture for implementing the server device of FIG. 1 consistent with principles of the invention.

FIG. 2 illustrates an exemplary architecture for implementing server 130 of FIG. 1 consistent with principles of the invention. It will be appreciated that client 110, network device 140, destination 160 and/or other devices in system 100 may be similarly configured. As illustrated in FIG. 2, server 130 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130. Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit an operator to input information to server 130, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as client 110 or network device 140. For example, communication interface 280 may include one or more interfaces, such as a first interface coupled to first network 120 and/or a second interface coupled to second network 150. Alternatively, communication interface 280 may include other mechanisms for communicating via a network, such as second network 150 and/or first network 120.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary Server Functional Diagram

Figure 3:
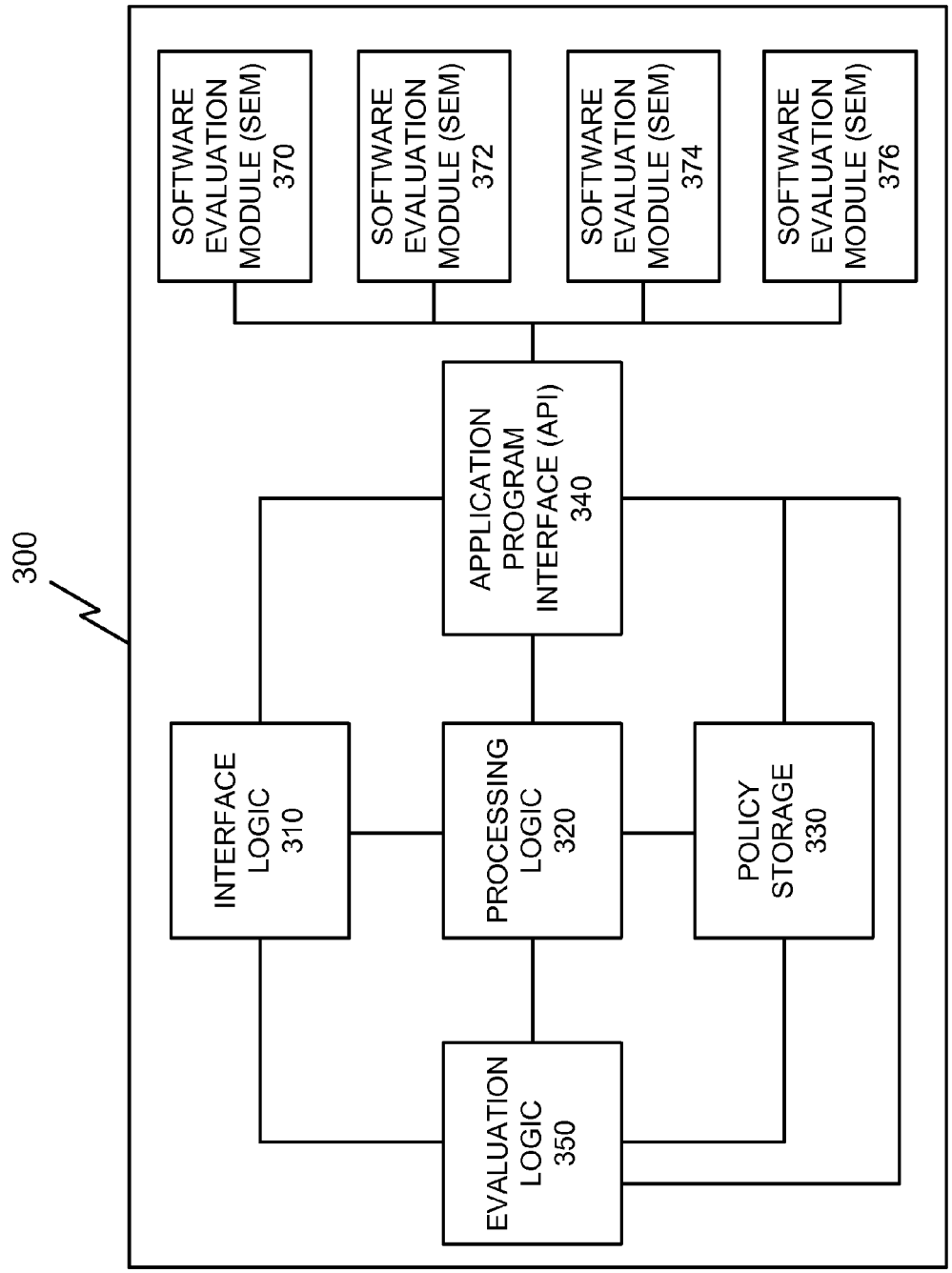
FIG. 3 illustrates an exemplary functional diagram of the server of FIG. 2 consistent with principles of the invention.

FIG. 3 illustrates an exemplary functional diagram of components implemented in server 130 consistent with principles of the invention. The functional diagram of FIG. 3 may include interface logic 310, processing logic 320, policy storage 330, application program interface (API) 340, evaluation logic 350 and software evaluation module (SEM) 370, 372, 374, and 376 (collectively SEMs 370). The implementation of FIG. 3 is exemplary, and server 130 may include more or fewer functional components without departing from the spirit of the invention.

Interface logic 310 may include hardware or software based logic to send or receive information to/from a destination. In one implementation, interface logic 310 may send a request for compliance measurements to client 110 and may receive a response from client 110. In another implementation, interface logic 310 may send enforcement instructions to network device 140. Interface logic 310 may be implemented in communication interface 280 or elsewhere in server 130.

Processing logic 320 may include hardware or software based logic to process instructions or data related to operations performed by server 130. For example, processing logic 320 may be implemented in processor 220 and may operate with evaluation logic 350 to create a controlled environment for determining the operation of SEMs 370 on server 130. Processing logic 320 may make processed information available to another device, software module, or component operating in server 130, such as SEMs 370, client 110, network device 140, and/or destination 160.

Policy storage 330 may include hardware or software based logic to store information related to network policies. For example, server 130 may store information related to an antivirus policy or a network security policy in policy storage 330. An antivirus policy may be used restrict access to destination 160 unless a sending device complies with the antivirus policy, such as by running a certain version of antivirus software or by having certain virus definitions loaded thereon. Server 130 may send antivirus information to a SEM so that the SEM can determine whether the sending device complies with the antivirus policy.

API 340 may include hardware or software based logic to enable server 130 to communicate with one or more SEMs 370. An API may include machine-executable instructions that send information to, or receive information from, applications, such as software modules. API 340 may allow server 130 to send information, such as policy identifiers, to SEMs 370 and to receive information from SEMs 370, such as policy results. API 340 may be adapted to communicate with substantially any number of SEMs 370, or server 130 may include a number of APIs, where each API is adapted to communicate with one or more SEMs 370. For example, server 130 may communicate with an antivirus SEM. The implementation of API 340 may be configured to communicate with SEMs 370 and/or other modules, devices, or software applications. For example, API 340 may be adapted to operate with remote SEMs (not shown in FIG. 3)(i.e., SEMs not co-located with server 130) via a communication protocol.

Evaluation logic 350 may include hardware or software based logic to initialize, create, run, and/or close a controlled environment on server 130. In an implementation, evaluation logic 350 may create a controlled environment by receiving SEM policies from policy storage 330 and/or another device, such as a storage device operating on server 130. The SEM policies may be used to create a controlled environment in which one or more SEMs 370 can be run. The controlled environment may allow features of SEMs 370 to be evaluated without sending data from SEMs 370 to server 130 and/or other devices unless the data is within determined parameters/ranges, such as ranges identifying normal operation for SEMs 370 according to a resource policy.

For example, a SEM policy for SEMs 370 may indicate that SEMs 370 should not access critical system files. The controlled environment may not allow SEMs 370 to access critical system code because doing so violates the SEM policy. The controlled environment may further prevent SEMs 370 from performing operations that might harm server 130 and/or other devices in system 100, such as by allowing SEMs 370 to access files, memory, network interfaces or ports, etc., when such accessing might harm server 130 and/or other devices in system 100. In contrast, a SEM operating outside a controlled environment, e.g., a SEM operating without SEM policies, may be able to perform operations that might harm client 110, server 130, and/or other devices in system 100.

SEMs 370 may include hardware or software based logic to make a determination with respect to one or more network policies. SEMs 370 may be implemented locally on server 130 and/or may be implemented remotely with respect to server 130 and coupled thereto via a link. SEMs 370 may receive information from client 110, server 130, and/or other devices in system 100 while operating in the controlled environment. SEMs 370 may further be allowed to send information to client 110, server 130 and/or other devices in system 100 as long as the information is within determined parameters, where the determined parameters identify an accepted operating range for SEMs 370. SEMs 370 may be allowed to perform operations related to a network policy so long as the operations are within a SEM policy pertaining to SEMs 370.

In one implementation, SEMs 370 may be implemented as extensible plug-in modules in server 130. A plug-in module may include self-contained logic adapted to execute instructions to perform an operation on behalf of a host device. A plug-in module may be configured to be moveable from one host device to another host device without requiring substantial modifications to the receiving host device in order to host and/or interact with the plug-in module. An extensible plug-in module may be adaptively sized or scaled to accommodate substantially any number of network policies. Implementations of SEMs 370 may determine policy requirements by retrieving policy details from a database. For example, SEMs 370 may consume policy information related to one or more network policies and/or SEM policies via the controlled environment. SEMs 370 may communicate with server 130 via API 340 when SEMs 370 reside locally with respect to server 130.

SEMs 370 may include input/output (I/O) logic to receive client configuration and runtime status information, policy identifiers (IDs), and/or policy contents from server 130 and to send policy compliance results, remediation instructions, etc., to server 130. For example, SEMs 370 may receive a list of policy identifiers, names, or contents and may return a list of policy compliance results or a policy list (e.g., a list of polices that client 110 is in compliance with) to server 130.

SEMs 370 may further include storage to store one or more network policies, network policy parameters, network policy results, and/or other information that can be used by SEMs 370 when determining policy requirements and/or producing policy compliance results. SEM storage may reside locally with SEMs 370 and/or may reside elsewhere, such as in memory 230 or in another device in system 100.

SEMs 370 may perform operations on configuration and runtime status information received from server 130 on behalf of client 110. For example, server 130 may receive measurement data from client 110. Server 130 may forward the measurement data, one or more policy IDs, and/or policy contents for one or more policies to SEMs 370. SEMs 370 may map policy IDs to policies and may process the measurement data, using the policy IDs, policy contents, and/or other policy related information contained in the SEM storage. SEMs 370 may determine the compliance of client 110 with respect to one or more network policies based on the measurement data received from client 110 and the information received from server 130.

SEMs 370 may be configured to operate with manifests that include information related to SEM operation. For example, SEM 372 may be an antivirus SEM and may include a manifest that identifies an author of SEM 372, a size of SEM 372, processing demands related to SEM 372, etc. Manifests may be read by server 130 to identify system resources used by SEMs 370. For example, a manifest may include information related to one or more SEM policies that apply to one or more SEMs.

Exemplary Controlled Environment

Figure 4:
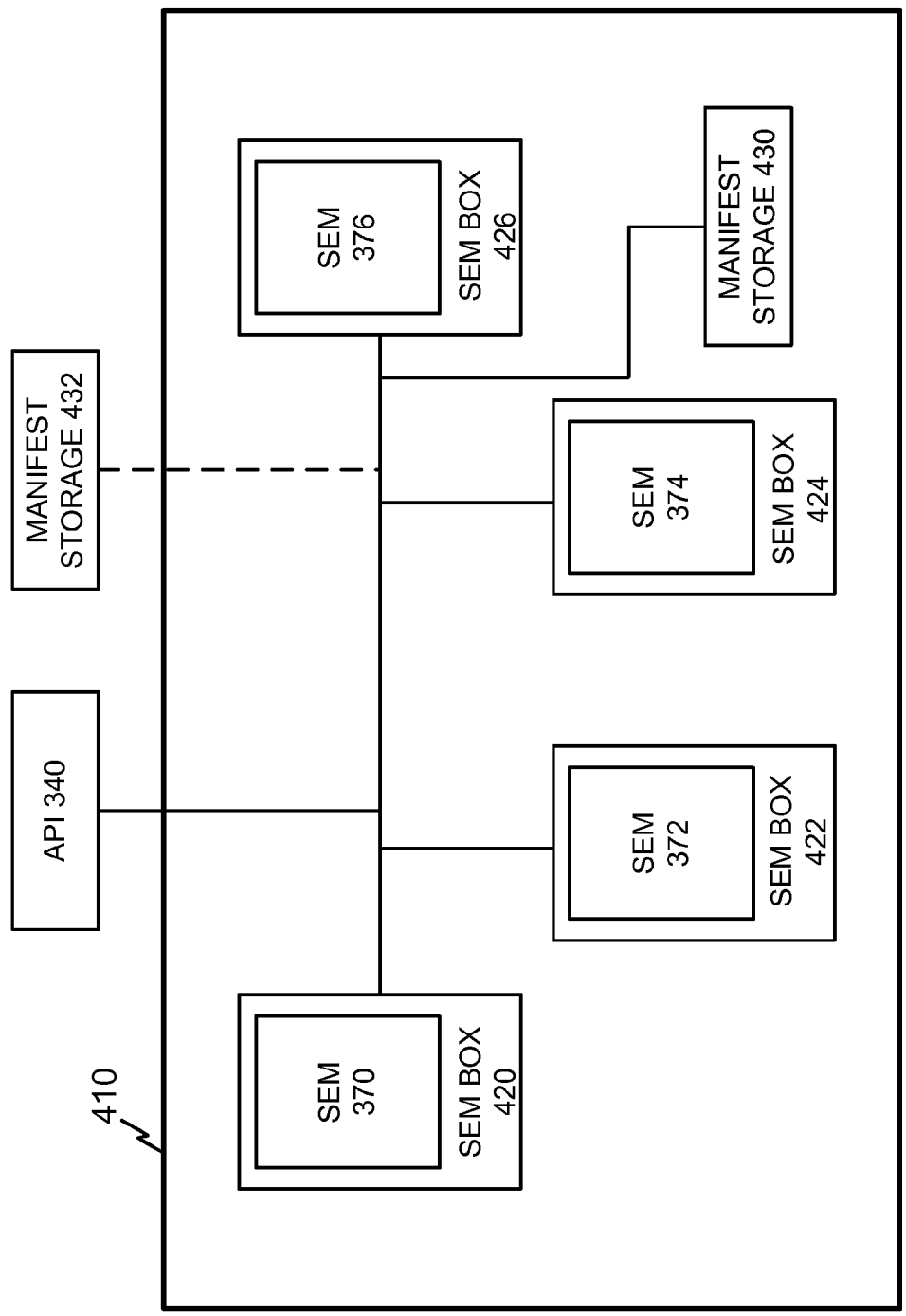
FIG. 4 illustrates an exemplary functional diagram of control box logic that can be implemented on the server of FIG. 2 to evaluate the operation of software evaluation modules consistent with principles of the invention.

FIG. 4 illustrates an exemplary functional diagram of control box 410 that can be implemented on server 130 to evaluate the operation of SEMs 370 consistent with principles of the invention. Implementations may use evaluation logic 350 to configure a controlled environment on server 130 to allow SEMs 370 to operate with respect to live traffic while preventing SEMs 370 from performing undesirable operations. In an implementation, the controlled environment may be implemented as control box 410.

Control box 410 may include hardware or software based logic to partition resources from a host device into a controlled environment. For example, control box 410 may reside in a portion of memory 230 on server 130 and/or elsewhere on server 130. Control box 410 may provide an environment where substantially any number of SEMs 370 can be run simultaneously in a manner whereby SEMs 370 cannot perform undesirable operations, such as operations outside a resource policy for SEMs 370. In one implementation, control box 410 may be configured using one or more SEM policies that determine proper operation for SEMs 370. Control box 410 may be configured to include SEMs 370 and/or logic related to SEMs 370, such as manifest storage 430. Alternatively, control box 410 may retrieve SEM policies from external storage, such as manifest storage 432. Control box 410 may further retrieve policy information from policy storage 330 and may use the information with SEMs 370. Control box 410 may be substantially transparent to API 340. For example, API 340 may communicate with SEMs 370 as if control box 410 was not present. Therefore, control box 410 may not disrupt normal operation of API 340 with respect to SEMs 370.

Control box 410 may include SEM 370, 372, 374, and 376, SEM boxes 420, 422, 424, and 426 (collectively SEM boxes 420), and manifest storage 430. SEMs 370 may be configured and may operate as described in connection with FIG. 3. SEM boxes 420 may include logic to create and maintain controlled and/or protected environments around respective ones of SEMs 370, such as SEM 370, 372, 374, and/or 376.

A SEM box 420, 422, 424, or 426 may prevent a SEM (e.g., SEM 372) from interacting with another SEM (e.g., SEM 370, 374, or 376) in an undesired manner, such as when the communication might violate a resource policy for the sending SEM or the receiving SEM. For example, SEM 372 may be configured to communicate with SEM 374 during normal operation of server 130 (e.g., according to a SEM policy). When SEMs 372 and 374 are run, SEM 372 may attempt to make an unauthorized write operation to a portion of memory allocated to SEM 374. SEM box 422 may trap the unauthorized write operation from SEM 372 and may terminate operation of SEM 372 so as not to disturb the operation of SEM 374. SEM box 422 may be configured to send an error message to server 130 and/or to another device in system 100.

Manifest storage 430 may include hardware or software based logic to store information, such as manifests, related to SEMs 370. A manifest may include information related to one or more SEMs 370. Manifest storage 430 may be implemented in a portion of memory 230 and may store information, such as an author name, SEM identifier, creation date, revision number, network connection information, processing requirements, destination directory names, etc. Manifest storage 430 may be implemented within control box 410 and/or outside control box 410, such as via manifest storage 432.

Control box 410 may be implemented on a single device and/or may be spread across multiple devices, such as in a distributed and/or parallel processing implementation.

Exemplary Manifest Data Structure

FIG. 5 illustrates an exemplary data structure for storing manifest 500 consistent with principles of the invention. Manifest 500 may be implemented via a computer-readable medium that can be used to store information in a machine-readable format and a number of manifests 500 may be stored in manifest storage 430. In an exemplary implementation, manifest 500 may be implemented as a table that may include information that identifies a SEM, such as one or more SEMs 370, and/or characteristics of one or more SEMs 370.

In one implementation, manifest 500 may be implemented via a template that includes fields adapted to receive information from an operator, such as a system administrator configuring server 130 and/or SEMs 370. The operator may populate fields in a template based implementation of manifest 500 before SEMs 370 are operated in the controlled environment.

In another implementation, manifest 500 may be populated by a device in system 100, such as server 130. Implementations of manifest 500 may be implemented in server 130 via memory 230 or via storage device 250. Implementations that employ a number of SEMs 370 may include a comparable number of manifests 500 and/or one manifest 500 may be shared by more than one SEM. Information stored in manifest 500 may be for a resource policy related to one or more SEMs 370.

Manifest 500 may include information arranged in fields, such as SEM author 510, date 520, SEM ID 530, space 540, connections 550, central processing unit (CPU) requirements 560, destination directory 570, and operator field 580. Information stored in manifest 500 may be arranged in a row and column format to facilitate interpretation by a user of server 130 and/or processing logic 320.

SEM author 510 may include information that identifies an author of SEMs 370. SEM author 510 may include a person's name, employee number, a company's name, a vendor identifier, etc. SEM author 510 may include authentication information, such as a digital certificate, watermark, etc., to help verify the identity of a person and/or entity identified in SEM author 510.

Date 520 may include information that identifies a date and/or time on which SEMs 370 were created, modified, or received via server 130. SEM ID 530 may include information that can be used to identify SEMs 370. For example, SEM ID 530 may include a name, number, revision number, and/or other information that identifies SEMs 370.

Space 540 may include information that can be used to identify a size of SEMs 370. For example, space 540 may indicate an amount of memory that a SEM requires. Connections 550 may include information that can be used to identify network connections, ports, interfaces, etc., that SEMs 370 may use when operating on server 130. For example, if an implementation of SEM 372 requires multiple network connections, the multiple network connections may be identified via connections 550.

CPU requirements 560 may include information that identifies an amount of processing power needed to operate a SEM related to manifest 500. CPU requirements 560 may include information represented as a percentage of a total processing capacity on a device, as a number of clock cycles, and/or in other units. Destination directory 570 may include information that identifies a destination where a SEM identified by SEM ID 530 will attempt to write information during its operation. Destination directory 570 may include the name of a directory, file, device, a link to a destination, etc.

Operator field 580 may include one or more fields adapted to receive information from an operator that configures a controlled environment in which SEMs 370 are run. In one implementation, operator field 580 may include a link to another data structure that includes a number of entries that can be populated by the operator. For example, an operator may enter information related to aspects of a resource policy that applies to SEM 370, such as a name or an address of a server that SEM 370 should communicate with while operating within a resource policy for SEM 370.

Exemplary Policy Information Data Structure

Figure 6:
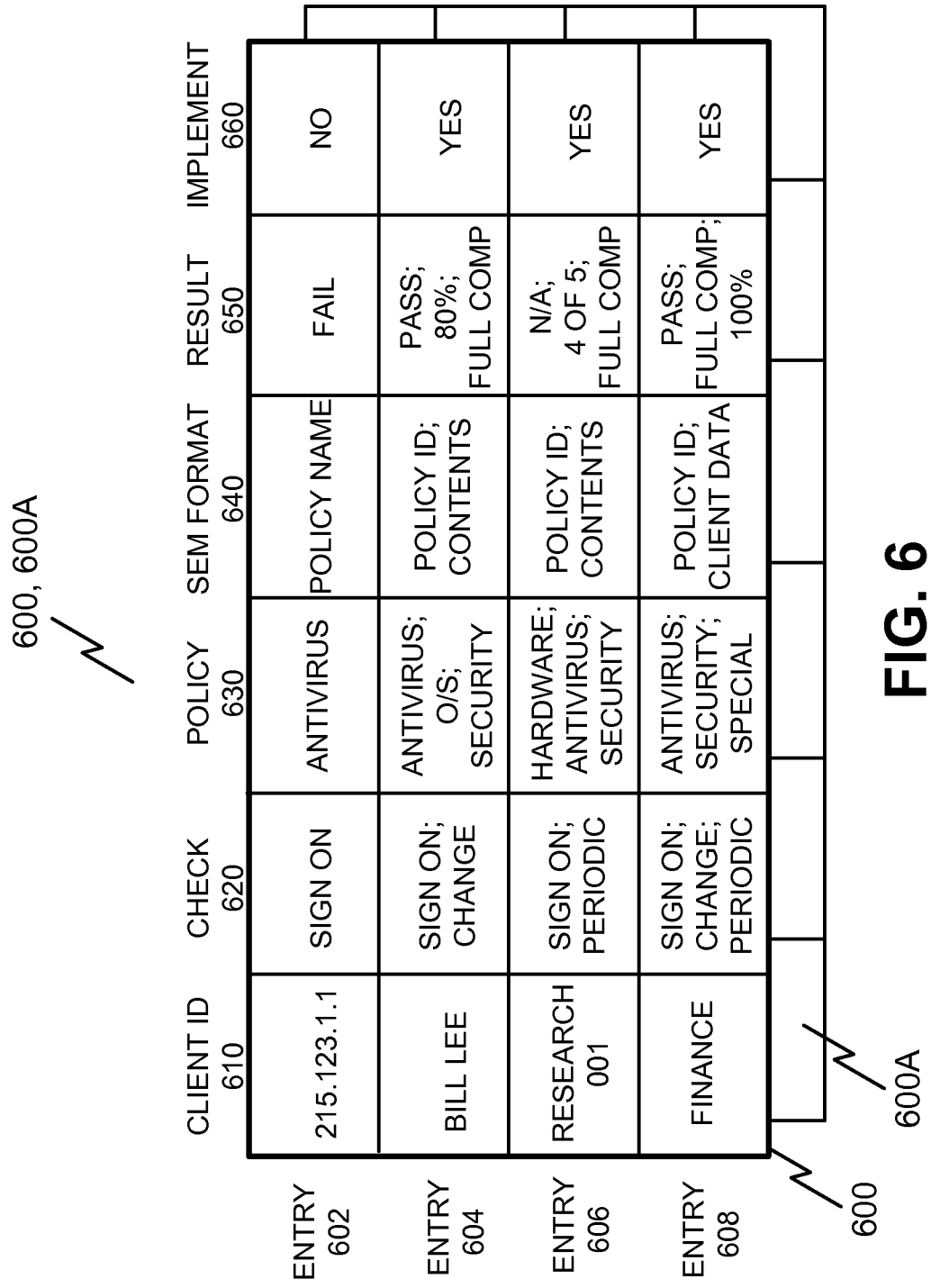
FIG. 6 illustrates an exemplary data structure that can be used to store network policy information consistent with principles of the invention.

FIG. 6 illustrates an exemplary data structure 600 that can be used to store network policy information consistent with principles of the invention. For example, data structure 600 may include information that identifies network policies for one or more clients 110 operating in system 100. Data structure 600 may be used by server 130 and/or other devices in system 100 to manage and implement network policies on behalf of devices operating in system 100. Information in other data structures, such as manifest 500, may be related to information in data structure 600. For example, manifest 500 may include information that identifies a resource policy, such as a SEM policy, for a SEM 370 operating on server 130. A network policy for an entry in data structure 600 may be implemented in system 100 when SEM 370 operates within the resource policy (e.g., when SEM 370 does not attempt to perform an unauthorized operation). SEMs 370 may operate in control box 410 while performing operations related to data structure 600, such as when determining whether client 110 is running a correct version of an antivirus program.

Data structure 600 may be implemented via a computer-readable medium that can be used to store information in a machine-readable format. In an exemplary implementation, data structure 600 may be implemented as a table that may include information that identifies client 110, network policies, data formats, network policy test results, and/or network status details related to the implementation of one or more network policies. In one implementation, data structure 600 may be implemented in server 130 via memory 230 or via storage device 250 and may store network policy information related to one or more SEMs 370.

Data structure 600 may include information arranged in fields, such as client ID field 610, check field 620, policy field 630, SEM format field 640, result field 650, and implement field 660. Entries 602-608 may be used to identify information associated with client ID field 610, check field 620, policy field 630, SEM format field 640, result field 650, and implement field 660. Implementations of server 130 may include one or more data structures, such as data structure 600 and 600A. Data structure 600A may include similar or the same fields as data structure 600. For example, data structure 600 may be related to SEM 372 and may include information related to an antivirus policy and data structure 600A may be related to SEM 374 and may include information related to a security policy.

Client ID 610 may include information that identifies client 110 or a user of client 110. For example, client ID 610 may include an internet protocol address, a group or department name, a geographic location identifier, such as a room number or street address, a user's name, user's social security number, etc.

Check 620 may include information to indicate when the compliance of client 110 should be determined. For example, "sign on" may indicate that the compliance, or health, of client 110 should be checked when client 110 attempts to sign on, or log into, a network. "Change" may indicate that the compliance of client 110 should be checked when there is a change in the network or a determined parameter related to the network. For example, the compliance of client 110 may be checked when a device on a network goes down or when malicious data units are detected in the network. "Periodic" may indicate that the compliance of client 110 should be checked periodically, such as at determined intervals, while client 110 is connected to the network. The status of client 110 may also be checked at other times or during other events. For example, a compliance check of client 110 may be triggered when client 110 attempts to access a certain resource, such as destination 160.

Policy 630 may include information that identifies one or more network policies related to client 110. For example, policy 630 may indicate that client 110 should be evaluated with respect to an antivirus policy, an operating system (O/S) policy, a security policy, a special policy, etc. A special policy may include a policy that is related to a certain destination, such as a device containing sensitive information. In other implementations, a special policy may include other types of information. Policy 630 may also include information that identifies one or more SEM policies for use with SEMs 370.

SEM format 640 may include information that identifies a format for client device related information that is sent from server 130 to SEMs 370. For example, server 130 may send a policy name to SEMs 370 for a client 110 in entry 602, a policy ID and policy contents for a client 110 in entry 604, and a policy ID and client data for a client 110 in entry 608. Information in SEM format 640 may be in substantially any form.

Result 650 may include information that identifies a result produced by SEMs 370. A result produced by SEMs 370 may include information that can be used to determine the compliance of client 110 with respect to one or more network policies. Result 650 may be represented in substantially any form. For example, a result can be provided as a "pass" or "fail" entry, on a graduated scale, such as 4 out of a possible 5, as a percentage, or as another form, such as fully compliant, partially compliant, satisfactory, etc. Result 650 may also include a link or address that references a file or another data structure that includes result information related to client 110. In one implementation, a result 650 of "passed" may indicate that control box 410 did not trap a result produced by one or more SEMs 370. In contrast, a result 650 of "failed" may indicate that a SEM result was trapped by control box 410.

Implement 660 may include information that identifies whether a policy related to client 110 can be implemented with respect to client 110. For example, server 130 may send a policy ID and client 110 configuration and runtime status information to one or more SEMs 370. SEMs 370 may process the configuration and runtime status information based on the policy ID and may return a result. Server 130 may send the result to network device 140 as an enforcement instruction so that network device 140 can enforce the policy with respect to client 110. Implement field 660 may include "yes" when result 650 has been determined to be compatible with network device 140 during normal operation of system 100 and may include "no" when result 650 has been determined to be unacceptable for use by network device 140 during normal operation of system 100.

Exemplary Message Exchange

Figure 7:
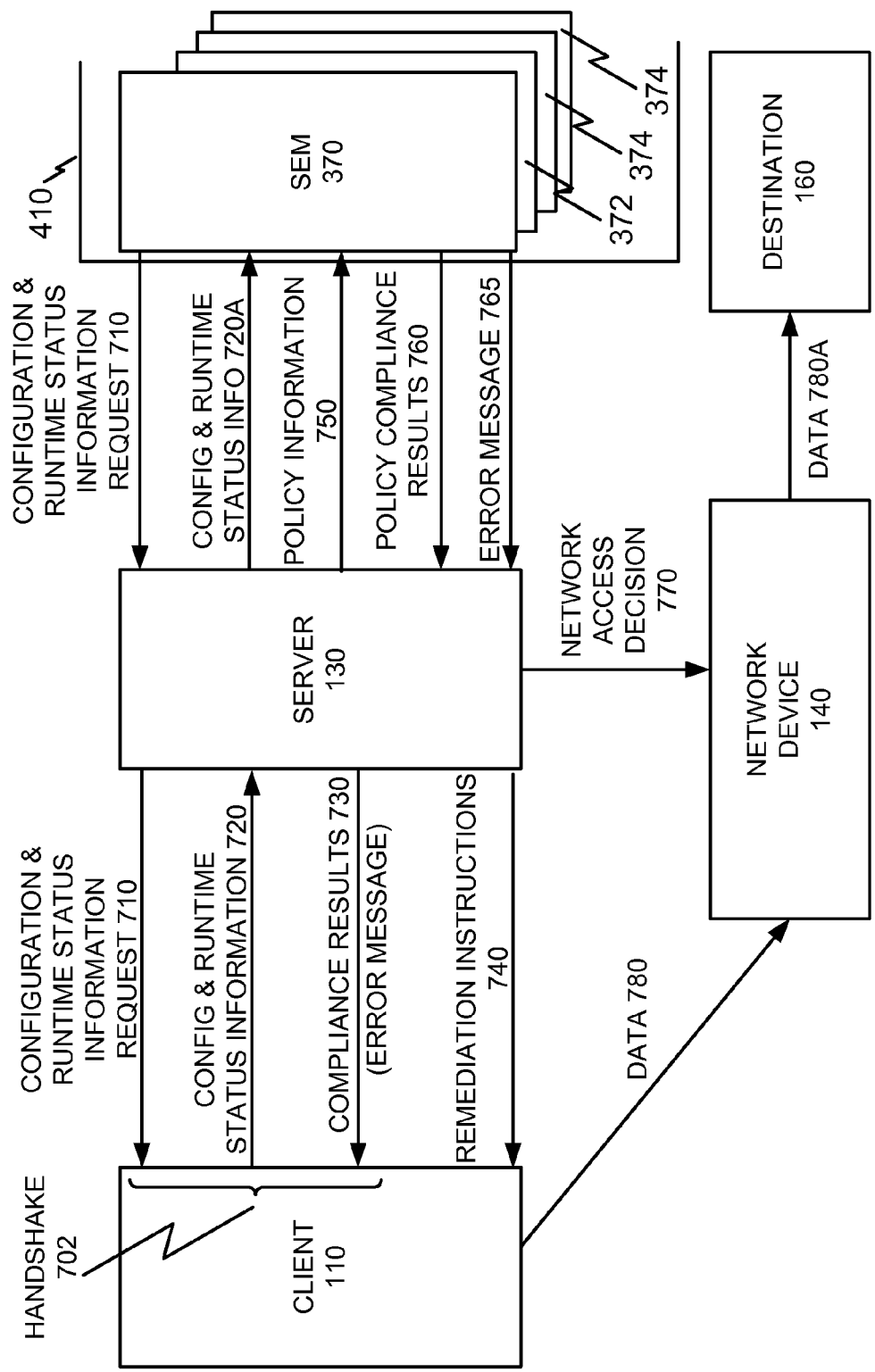
FIG. 7 illustrates exemplary messages that can be exchanged between a client, server, network device, and destination to evaluate the operation of software evaluation modules consistent with principles of the invention.

FIG. 7 illustrates exemplary messages that can be exchanged between client 110, server 130, network device 140, and destination 160 to evaluate the operation of SEMs 370 consistent with principles of the invention. Other implementations may include more or fewer devices and/or messages and/or may include other types of devices and/or messages without departing from the spirit of the invention.

The implementation of FIG. 7 may include client 110, server 130, network device 140, destination 160, one or more SEMs 370, 372, 374 and 376, and control box 410. The devices of FIG. 7 may exchange messages, such as configuration and runtime status information request 710 (hereinafter status information request 710), configuration and runtime status information 720 (hereinafter status information 720), configuration and runtime status information 720A (hereinafter status information 720A), compliance results 730, remediation instructions 740, policy information 750, policy compliance results 760, error message 765, network access decision 770, data 780 and data 780A.

In one implementation, server 130 and client 110 may use a handshake 702 to exchange compliance information therebetween. Handshake 702 may include status information request 710, status information 720, and/or compliance results 730. Other implementations may include more or fewer messages in handshake 702.

Status information request 710 may include a query from server 130 to client 110 for compliance information. For example, client 110 may attempt to log onto second network 150. Server 130 may be configured to determine the health, or compliance, of client 110 before allowing client 110 to access second network 150. Server 130 may send status information request 710 to client 110 when client 110 attempts to log onto second network 150. In other implementations, server 130 may send status information request 710 to client 110 when a change is detected in second network 150 or in client 110, at periodic intervals determined by server 130, and/or when network policies or sub-policies change. In still other implementations, status information request 710 may not be used.

In one implementation, status information request 710 may include a query sent from SEM 370 to server 130 and/or client 110 for information needed by SEM 370 to perform an operation on behalf of client 110, server 130, and/or another device in system 100. For example, SEM 370 may request information about a software revision operating on client 110, where the software revision information may be needed by SEM 370 to determine whether client 110 is running an appropriate revision of the software, such as a software revision that includes patches correcting security issues related to the software. Status information request 710 may identify the software application and may request information about the software version operating on client 110. SEM 370 may send status information request 710 while operating according to a SEM policy within control box 410 on server 130.

Status information 720 may include information that can be used by server 130 and/or SEMs 370 to determine the state of client device 110 and/or compliance of client 110 with respect to one or more network policies. For example, in one implementation, server 130 may receive information about software revisions installed on client 110, hardware and/or software removed or installed on client 110, patches to software applications operating on client 110, antivirus definition updates installed on client 110, hardware configurations implemented on client 110, files residing on client 110, and/or destination devices that client 110 is trying to contact.

The implementation of FIG. 7 shows status information 720 being provided to server 130. Other implementations (not shown in FIG. 7) may omit status information 720 and/or status information 720A. In still other implementations (not shown in FIG. 7) client 110 may send configuration and runtime status information to another device, or client 110 may have the other device generate configuration and runtime status information without assistance from client 110, where the other device sends the configuration and runtime status information to server 130, and/or SEMs 370 on behalf of client 110. In an implementation, status information 720 may include a request, such as a request to reach a destination, a request to have the compliance of client 110 determined, etc.

Status information 720A may include information in status information 720 and/or may include additional information. For example, server 130 may supplement status information 720 with information that identifies server 130 and/or prior configuration and runtime status information obtained from client 110. Server 130 may send the supplemented status information to SEMs 370 as status information 720A.

Compliance results 730 may include information that informs client 110 about the results of policy and/or sub-policy compliance evaluations performed on behalf of client 110. For example, compliance results 730 may inform client 110 whether it will be allowed to connect to a certain resource on second network 150. In one implementation, compliance results 730 may include an authorization mechanism, such as a code. The code may include a cookie, a key, or an authorization code that client 110 can use to verify its compliance with one or more network policies to network device 140 and/or destination 160. In another implementation, compliance results 730 may include an error message that informs client 110 that a SEM related to status information 720/720A malfunctioned when processing status information 720/720A.

Remediation instructions 740 may include information that can be used by client 110 to correct deficiencies with respect to one or more policies. For example, when client 110 is not compliant with a policy or sub-policy, remediation instructions 740 may provide client 110 with a link to a web site that includes updates that will bring client 110 into compliance. In another implementation, remediation instructions 740 may provide client 110 with software that can be run to bring client 110 into compliance. In yet another implementation, remediation instructions 740 may include text that can be used by an operator of client 110 to bring client 110 into compliance.

Policy information 750 may include information that identifies one or more policies related to client 110. Policy information 750 may include information identifying a single policy or multiple policies. Server 130 may send policy information 750 to a single SEM, such as SEM 372, or to multiple SEMs, such as SEMs 370, 372, 374, and 376. Server 130 may map policy information with status information 720 and may send policy information 750 to SEMs 370 with status information 720A. In one implementation, policy information 750 may identify a network policy by name, number, or other identifier. In another implementation, policy information 750 may include the contents of one or more policies that SEMs 370 are being asked to evaluate. In still another implementation, policy information 750 may include information about the contents of one or more sub-policies that are related to a policy.

In one implementation, policy information 750 may include information about one or more SEM policies. For example, server 130 may access manifest 432 that may reside in memory 230. Server 130 may retrieve a SEM policy that controls operation of a SEM, e.g., SEM 372, while the SEM operates in control box 410 to process status information 720 on behalf of client 110. Other implementations of policy information 750 may include other types of information.

Policy compliance results 760 may include information that identifies one or more results related to the evaluation of one or more policies or sub-policies on behalf of client 110. In one implementation, SEMs 372, 374 and/or 376 may send a message or a data structure that includes policy compliance results 760 to a destination, such as server 130 or client 110. For example, the data structure may include a list of policy results that server 130 can map to status information 720 and/or policy information 750.

Error message 765 may include information about an error related to SEMs 370, 372, 374 and/or 376. Error message 765 may include information that identifies a SEM, an operation performed by a SEM, a termination time for the SEM, etc. Server 130 may provide information related to error message 765 to client 110 via compliance result 730. Assume, for the sake of example, that SEM 372 receives policy information 750 and status information 720A and generates a policy compliance result 760 that attempts to overwrite a configuration file on server 130. Control box 410 may detect the improper write attempt related to SEM 372 and may trap policy compliance result 760. Control box 410 may terminate the operation of SEM 372 to prevent further unauthorized write attempts. Control box 410 may generate error message 765 and may send error message 765 to server 130 and/or to a requesting device, such as client 110. Server 130 may send error message 765 to client 110.

Network access decision 770 may include information that can be used by network device 140 to grant or deny access to client 110 with respect to second network 150. In one implementation, network access decision 770 may provide network device 140 with a list of destination names, destination addresses, destination directories, destination files, etc., with which client 110 is allowed to communicate. Server 130 may provide network device 140 with information that identifies resources that client 110 is allowed to access, information that identifies resources that client 110 is not allowed to access, and/or may provide information that identifies resources that client 110 is and is not allowed to access. Network access decision 770 may include an enforcement instruction, an authorization instruction, etc. In one implementation, server 130 may generate network access decision 770 when a valid policy compliance result 760 is received from SEMs 370. For example, server 130 may not generate network access decision 770 when error message 765 is produced by SEMs 370.

Data 780 and 780A may include information that client 110 exchanges with network device 140 and/or destination 160 when client 110 is compliant with one or more policies. Network device 140 may receive data from client 110 and may forward received data to destination 160 as data 780A when client 110 is determined to be in compliance with one or more network policies related to destination 160.

Messages exchanged between the devices of FIG. 7 may be exchanged via first network 120, second network 150, and/or dedicated links. In addition, the devices of FIG. 7 may communicate with encrypted and/or unencrypted data units using one or more communication protocols.

Exemplary Initialization Process

Figure 8:
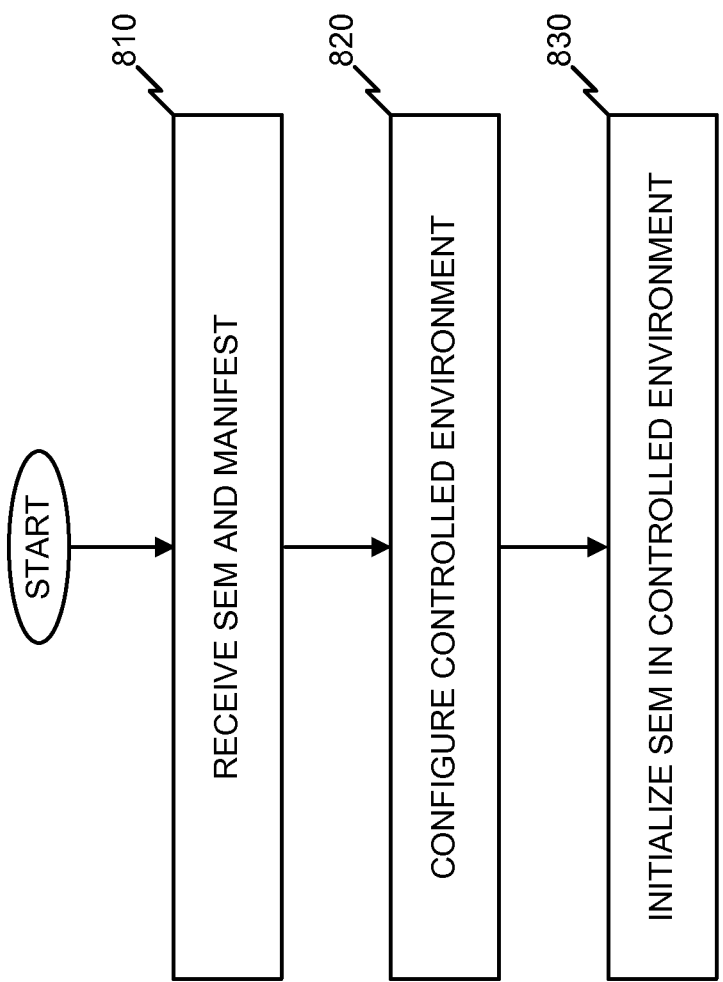
FIG. 8 illustrates exemplary processing to initialize a software evaluation module in a controlled environment consistent with principles of the invention.

FIG. 8 illustrates exemplary processing to initialize SEMs 370 consistent with principles of the invention. In one implementation, the exemplary processing of FIG. 8 may be performed by server 130. In other implementations, exemplary processing may be performed by other devices, such as client 110, network device 140 and/or destination 160. Implementations described herein may be used to evaluate the state, health, or compliance, of a client device. For example, client 110 may be checked to determine whether client 110 complies with a network policy (e.g., determining whether client 110 is running software and/or hardware that meets determined criteria, such as whether the software and/or hardware is of a specified revision level or certain configuration, is associated with a proper user identity, is allowed to access certain network resources, etc.).

Server 130 may be configured as a policy decision point in a network. Server 130 may determine the compliance of a device, such as client 110, before letting the device access a portion of a network. Server 130 may be configured to determine the compliance of client 110 at determined times. In one implementation, server 130 may check the compliance of client 110 when client 110 attempts to access a network, such as second network 150. In a second implementation, server 130 may determine the compliance of client 110 at determined intervals which may be programmable, such as once per day, when a change in a network parameter occurs, when malicious activity is detected on second network 150, when a new network policy is implemented, when client 110 attempts to access a protected resource, etc. Server 130 may retrieve information from data structure 600 to determine when client 110 should be checked for compliance with respect to one or more network policies.

Implementations of server 130 may use one or more SEMs, such as SEMs 370, 372, 374 or 376, to determine the compliance of client 110 with respect to a network policy. SEMs 370 may provide server 130 with a modular architecture that can be used to scale server 130 according to network security needs related to system 100. Server 130 may further be configured to work with SEMs 370 from a number of vendors. For example, server 130 and its operating system may be provided by a first manufacturer, or vendor, while a first SEM (e.g., SEM 372) may be provided by a second vendor that provides antivirus software and a second SEM (e.g., SEM 374) may be provided by a third vendor that provides personal firewall software. Server 130 may determine the compliance of client 110 with respect to antivirus software (e.g., whether client 110 is running up-to-date antivirus software definitions) and/or with respect to personal firewall software (e.g., whether client 110 has the latest firewall security patches installed).

Evaluating the operation of SEMs 370 with live traffic may allow network operators to determine specific behaviors of SEMs 370 that are encountered in operational environments. Implementations may use evaluation logic 350 and/or control box 410 to allow substantially any number of SEMs to be evaluated with respect to live traffic.

Server 130 may receive SEM 370, 372, 374 and/or 376 along with respective manifests 500 (block 810). Server 130 may receive SEMs 370 via computer readable medium and/or via a network connection. Server 130 may load SEMs 370 and/or manifests 500 into memory 230. As previously discussed, manifest 500 may take many forms. For example, a first implementation of manifest 500 may be in the form of a template that includes fields for information entered by an operator, such as a system administrator. In a second implementation, manifest 500 may be implemented as a table that is populated with information by a device, such as a device operating in system 100. In still other implementations, manifest 500 may take other forms.

Manifest 500 may include information that identifies a SEM policy for SEMs 370, where the SEM policy identifies a desired operating envelope for SEMs 370 while SEMs 370 perform operations related to a network policy administered by server 130. SEM policies may identify a predicted manner of operation for modules (e.g., SEMs 370) operating on server 130 or elsewhere in system 100.

Server 130 may configure a controlled environment (block 820). In an implementation, server 130 may establish control box 410 in a portion of memory 230 using one or more SEM policies that govern the operation of SEMs 370. Server 130 may further partition the portion of memory into one or more SEM boxes 420, 422, 424, and/or 426. Server 130 may load SEM 370 into SEM box 420, SEM 372 into SEM box 422, SEM 374 into SEM box 424 and SEM 376 into SEM box 426. Server 130 may further load manifests 500 (e.g., resource policies) for SEM 370, 372, 374 and 376 into manifest storage 430 and/or 432 and/or into another portion of memory 230. Server 130 may further allocate needed processing resources, such as CPU cycles, and/or may identify destination devices and/or directories that one or more SEMs 370 may utilize when operating on server 130 according to the SEM policies. In an implementation, an administrator may inspect manifest 500 and/or may enter configurable parameters therein, such as a host name. Manifest 500 may be allowed to be initialized on server 130 when the administrator is satisfied with a configuration of manifest 500.

In an implementation, server 130 may run control box 410, SEMs 370 and SEM boxes 420 via a virtual machine. For example, server 130 may use VMWare, Xen, Java, .Net, secure LINUX (SELINUX) and/or LINUX intrusion detection system (LIDS) to create implementations of virtual machines thereon for evaluating SEMs 370. Other implementations of server 130 may use scripted languages, such as JavaScript and/or Perl, to implement SEMs 370 and/or virtual environments on server 130. Still other implementations may implement control box 410 via other techniques.

Server 130 may initialize SEMs 370 in the controlled environment (block 830). SEMs 370 may be ready to receive information, such as status information 720 from client 110 upon initialization by server 130. Implementations of server 130 may be configured to run the controlled environment whenever server 130 is turned on, to run the controlled environment when server 130 is operating with network traffic, and/or to run the controlled environment selectively, such as at determined intervals, when testing is performed on a portion of system 100, etc. Server 130 may associate SEM policies with SEMs 370 when SEMs 370 are initialized.

Exemplary Processing

Figure 9:
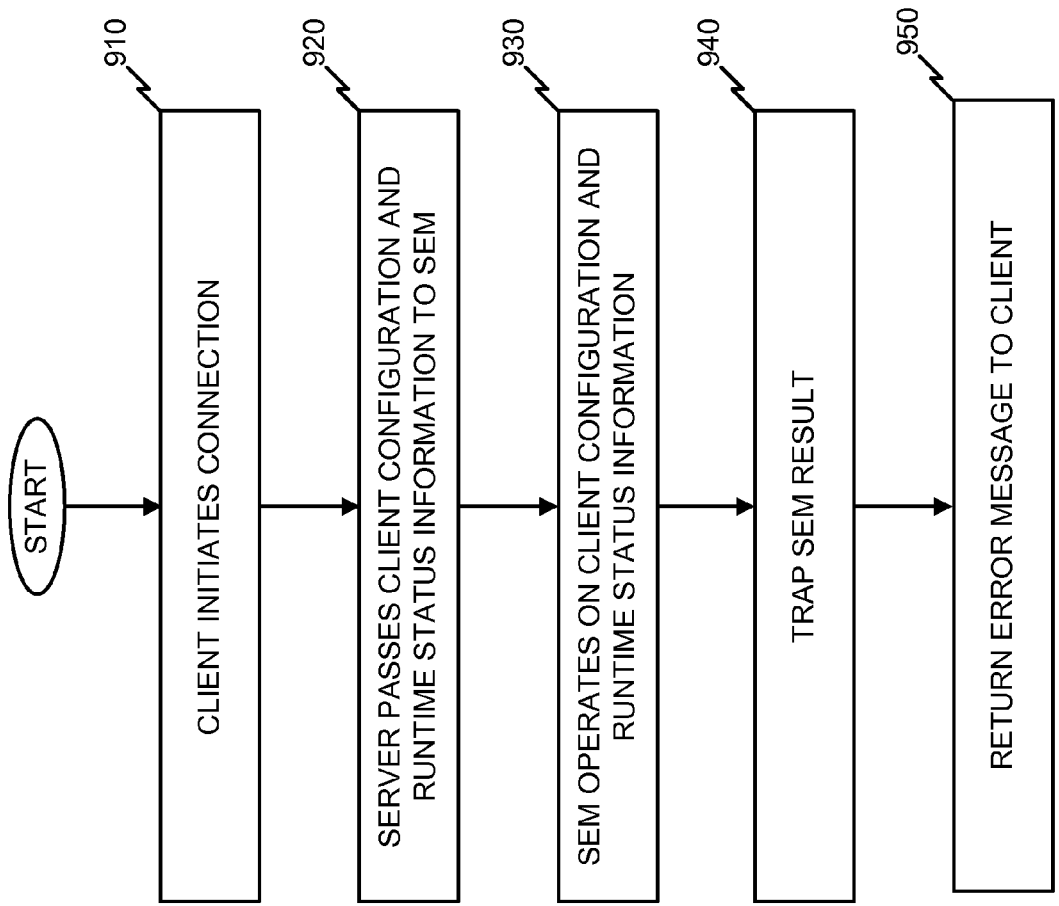
FIG. 9 illustrates exemplary processing that can be used to evaluate the operation of a software evaluation module consistent with the principles of the invention.

FIG. 9 illustrates exemplary processing to evaluate and implement network policies consistent with principles of the invention. Client 110 may initiate a connection with a destination device, such as destination 160 (block 910). For example, system 100 may be configured to allow only compliant devices to communicate with destination 160. Client 110 may send status information 720 to server 130 in order to have its compliance determined.

In one implementation, server 130 may send status request 710 to client 110 and client 11 may provide status information 720 in response to status request 710. For example, SEMs 370 may be adapted to request information from client 110 via information request 710 (FIG. 7). For example, server 130 may request that SEMs 370 perform a policy evaluation on behalf of client 110. SEMs 370 may issue information request 710 to obtain information from client 110 that is needed to perform the requested policy evaluation. Client 110 may send the requested information to server 130 and SEMs 370 via status information 720.

Status information 720 may include information about client 110 that can be used to establish the compliance or non-compliance of client 110. In one implementation, client 110 may produce status information 720 by running a script, by reading information from a table, such as a configuration table, etc. Status information 720 may be sent to server 130 via first network 120, another network, and/or a dedicated link. Status information 720 may further be sent from client 110 to server 130 in an encrypted format or an unencrypted format.

Server 130 may store status information 720 in a data structure in memory 230 and/or may process status information 720, such as by decrypting status information 720 or by converting status information 720 into a format compatible with SEMs 370. In one implementation, status information 720 may include a request from client 110, such as a connection request.

Server 130 may send configuration and runtime status information to SEMs 370 (block 920). Server 130 may pass status information 720 to SEMs 370 and/or may operate on status information 720 to produce status information 720A and may pass status information 720A to SEMs 370. Server 130 may also pass policy information 750 to SEMs 370, where policy information 750 may include policy IDs, policy names, and/or policy contents. For example, server 130 may pass SEMs 370 policy names that are related to policies pertaining to client 110. Assume that client 215.123.1.1 (entry 602, FIG. 6) provides compliance information at network sign on (check 620). Further assume that server 130 may determine that client 215.123.1.1 should be evaluated with respect to an antivirus policy by retrieving information for policy 630 that is related to client 215.123.1.1. Server 130 may send the antivirus policy name to SEMs 370 since SEM format 640 indicates "policy name" for client 215.123.1.1.

Server 130 may be configured to provide policy related information to SEMs 370 in a variety of formats. For example, server 130 can provide SEMs 370 with a policy name, as discussed above, a policy ID, such as a policy number, and/or policy contents. Assume server 130 may use "policy name: antivirus," "policy ID: A-165," or "policy contents: antivirus.patch.26" to inform SEMs 370 that client 110 should be evaluated with respect to an antivirus policy. Server 130 may send a policy ID, name, and/or contents to SEMs 370 as policy information 750 before sending status information 720A to SEMs 370, after sending status information 720A to SEMs 370, or at substantially the same time that status information 720A are sent to SEMs 370. In one implementation, server 130 may send SEM policies to SEMs 370 via policy information 750.

Server 130 may communicate with SEMs 370 via an API when SEMs 370 are operating on server 130. For example, API 340 may be used to communicate with SEMs 370 that are implemented as plug-in modules operating on server 130. In an alternative implementation, SEMs 370 may be remotely located with respect to server 130. For example, SEMs 370 may be installed on a remote device with respect to server 130 and coupled to server 130 via a link. Server 130 may communicate with remote SEMs 370 via a communication protocol. Implementations of server 130 may send multiple policy IDs, names, and/or contents to SEMs 370 via policy information 750 (e.g., in a parallel arrangement), or server 130 may queue policy IDs, names and/or contents and may send them to SEMs 370 one at a time (e.g., in a serial arrangement).

SEMs 370 may operate on the configuration and runtime status information received from client 110 (block 930). For example, SEM 370 may operate on configuration and runtime status information according to a SEM policy managed by server 130. In one implementation, one or more SEMs 370 may simultaneously check the compliance of an end point with respect to two or more policies. For example, SEM 372 may determine if client 110 is compliant with a first email policy related to a first portion of second network 150 and whether client 110 is compliant with a second email policy related to a second portion of second network 150 at substantially the same time.

In one implementation, SEMs 370 may maintain policy related information in a hierarchy, such as by relating one or more sub-policies to a policy. For example, an antivirus policy may require that components, or subsystems, on client 110 are compliant with one or more antivirus sub-policies, such as an email sub-policy, an operating system sub-policy, a firewall sub-policy, a web browser sub-policy, and a data files sub-policy.

SEMs 370 may attempt to return policy results to server 130. For example, server 130 may send a list of three policies to SEMs 370. After determining the compliance of client 110 with respect to the three policies, SEMs 370 may attempt to return three policy results to server 130.

Control box 410 may trap the policy result(s) (block 940). Control box 410 may monitor the operation of SEMs 370 while SEMs 370 operate on the request received from client 110. Control box 410 may allow SEMs 370 to operate and to exchange information with server 130 as long as SEMs 370 operate in a predicted manner (e.g., within a SEM policy). Control box 410 may be configured to trap the execution of SEMs 370 when the one or more SEMs behave outside the SEM policy defined via manifest 500. Policy compliance results 760 may be trapped via SEM boxes 420, via SEM boxes 420 and control box 410, or using only control box 410. Control box 410 may terminate operation of SEMs 370 that operate outside a SEM policy.

Control box 410 and/or SEM boxes 420 may generate an error message 765 when improper operation of one or more SEMs 370 is detected. Control box 410 may send error message 765 to server 130 via API 340 and/or via a protocol. Server 130 may return error message 765 to client 110 (block 950). Error message 765 may provide client 110 with a description of the error that was encountered when SEMs 370 were operating on status information 720/720A. In one implementation, error message 765 may be sent to client 110 via compliance result 730.

When SEMs 370 operate according to a SEM policy, server 130 may receive policy compliance result 760 from SEMs 370. Server 130 may implement a network policy based on policy compliance result 760. For example, server 130 may map policy compliance result 760 (e.g., that client 110 identified by 215.123.1.1 failed an antivirus policy compliance check) to information in a database to determine whether client 110 can access any portions of second network 150 while running non-compliant antivirus software. For example, server 130 may determine that client 110 (215.123.1.1) can access a virtual LAN (e.g., VLAN 1) while running non-compliant antivirus software when VLAN1 includes only a portal to the World Wide Web. Server 130 may send a message, such as "215.123.1.1:VLAN1," to network device 140 when client 110 can access certain resources, such as VLAN1, on second network 150.

Alternatively, server 130 may determine that client 110 (215.123.1.1) cannot access any resources on second network 150 while running non-compliant antivirus software. Server 130 may send a message, such as "215.123.1.1:Denied," to network device 140 when client 110 cannot access any resources on second network 150.

In one implementation, server 130 may send compliance result information to client 110 via compliance result 730. For example, server 130 may inform client 110 that it cannot access portions of second network 150 since client 110 is not running compliant antivirus software. Implementations of server 130 may provide client 110 with remediation information alone or in combination with compliance result 730. For example, server 130 may send remediation information to client 110 via remediation instructions 740. Remediation instructions 740 may include software patches to bring client 110 into compliance with the antivirus policy, may include a link to a destination that includes information to bring client 110 into compliance with the antivirus policy, may include text to inform client 110, or another individual, about actions that should be performed to bring client 110 into compliance with the antivirus policy, etc.

Network device 140 may permit or deny access to resources on second network 150 based on policy result information received from server 130. Assume that server 130 determines that client 110 is compliant with an antivirus policy. Further assume that server 130 sends network device 140 a message, such as network access decision 770, indicating that client 110 should be placed on a certain network or portion of a network, such as VLAN 5. Network device 140 may receive a request from client 110 to access a resource on second network 150, such as destination 160. Network device 140 may forward the request received from client 110 to destination 160 when client 110 is in compliance with a network policy related to destination device 160. When server 130 determines that client 110 has fallen out of compliance with a network policy related to destination 160, server 130 may send updated enforcement instructions to network device 140. The updated enforcement instructions may inform network device 140 that client 110 is no longer compliant with a network policy related to destination 160. Network device 140 may process the updated enforcement instructions and may terminate a connection between client 110 and one or more resources on second network 150.

Implementations of network device 140 may grant access to all portions of second network 150, to certain portions of second network 150, to a single device on second network 150, and/or to a file or directory on second network 150 based on information included in network access decision 770.

Alternative implementations of system 100 may be configured with the functionality of server 130, network device 140, evaluation logic 350, SEMs 370, control box 410 and/or SEM boxes 420 implemented in client 110. For example, the functionality of network device 140, with respect to policy enforcement, may be embedded into hardware or software on client 110. Client 110 may be allowed to access a protected resource when server 130 and SEMs 370 determine that client 110 complies with one or more network polices. In contrast, results produced by SEMs 370 may be trapped and/or error messages generated when SEMs 370 fail to operate according to a resource.

In other alternative implementations, the functionality of server 130 and SEMs 370 may be implemented in network device 140. In still other alternative implementations, other configurations of client 110, server 130, network device 140, destination 160 and SEMs 370 are possible.

Implementations described herein have been illustrated and discussed with respect to a networked environment. Other implementations may be adapted for use in non-networked environments. For example, a standalone device may have its compliance checked via a SEM operating thereon within control box 410. The SEM may be configured to evaluate the compliance of the standalone device with respect to hardware or software policies. The SEM may include functionality of server 130 and/or network device 140 when operating in a standalone device. The SEM can be upgraded or reconfigured to accommodate changes in the standalone device, such as the addition of new hardware or new software. Standalone implementations may be adapted for use in appliances, vehicles, aircraft, industrial devices or systems, testing devices, etc., without departing from the spirit of the invention.

CONCLUSION

Implementations may allow a plug-in module, such as a SEM, to evaluate multiple policies and/or sub-policies on behalf of a host device, such as a server. The SEM may be configured to operate on multiple policies and/or sub-policies at substantially the same time and to provide the host device with policy or sub-policy results when the SEM operates in a determined manner. The host device may use the results to implement policies, such as network policies, with respect to an endpoint. A host device running the SEM may be configured to trap errors generated by the SEM so that the SEM cannot harm the host device and/or other devices on a network. The host device may further terminate operation of the SEM when the SEM attempts to perform an unauthorized operation.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 8 and 9, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-4, and 7 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application specific integrated circuit, a field programmable gate array, a microprocessor, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method comprising:
   receiving, by a first device and from a second device, first information relating to whether the second device complies with one or more policies,
      the first device being different than the second device, and
      the one or more policies relating to accessing a network;
   identifying, by the first device and based on the first information, second information that identifies the one or more policies;
   causing, by the first device, a determination, using the first information and the second information, to be made as to whether the second device complies with the one or more policies;
   determining, by the first device, whether a result of the determination corresponds to an authorized operation relating to the first device;
   sending, by the first device and to the second device, a message indicating that the second device is denied access to the network when the result does not correspond to the authorized operation; and
   sending, by the first device and to a third device, instructions relating to the second device accessing the network when the result corresponds to the authorized operation,
      the third device to determine whether to grant access to the network, to the second device, based on the instructions.

2. The method of claim 1, where causing the determination to be made as to whether the second device complies with the one or more policies includes:
   determining, by at least one device of the first device and using the first information and the second information, whether the second device complies with the one or more policies.

3. The method of claim 2, further comprising:
   determining that the result does not correspond to the authorized operation; and
   terminating operation of the at least one device.

4. The method of claim 1, where causing the determination to be made as to whether the second device complies with the one or more policies includes:
   causing one or more devices to determine, using the first information and the second information, whether the second device complies with the one or more policies,
      the one or more devices being located remotely from the first device.

5. The method of claim 1, where the result includes an attempt to overwrite a configuration file of the first device, and
   where the method further comprises:
      determining that the result does not correspond to the authorized operation based on the result including the attempt to overwrite the configuration file on the first device.

6. The method of claim 1, where causing the determination to be made as to whether the second device complies with the one or more policies includes:
   determining whether the second device is running software that meets particular criteria.

7. The method of claim 6, determining whether the second device is running the software that meets the particular criteria includes:
   determining whether the software is authorized to access one or more network resources.

8. The method of claim 1, where sending the instructions relating to the second device accessing the network includes:
   sending, to the third device, information identifying one or more resources that the second device is authorized to access,
      the third device granting the second device access to the one or more resources based on the information identifying the one or more resources.

9. A non-transitory computer-readable memory device storing instructions, the instructions comprising:
   one or more instructions, which when executed by a first device, cause the first device to receive, from a second device, first information relating to whether the second device complies with one or more policies,
      the first device being different than the second device, and
      the one or more policies relating to accessing a network;
   one or more instructions, which when executed by the first device, cause the first device to identify, based on the first information, second information that identifies the one or more policies;
   one or more instructions, which when executed by the first device, cause the first device to cause a determination, using the first information and the second information, to be made as to whether the second device complies with the one or more policies;
   one or more instructions, which when executed by the first device, cause the first device to determine whether a result of the determination corresponds to an authorized operation relating to the first device;
   one or more instructions, which when executed by the first device, cause the first device to send, to the second device, a message indicating that the second device is denied access to the network when the result does not correspond to the authorized operation; and
   one or more instructions, which when executed by the first device, cause the first device to send, to a third device, third information relating to the second device accessing the network when the result corresponds to the authorized operation, the third device to determine whether to grant, to the second device, access to the network based on the third information.

10. The non-transitory computer-readable memory device of claim 9, where the result corresponds to an attempt to perform an unauthorized write operation, and
where the instructions further comprise:
one or more instructions to determine that the result does not correspond to the authorized operation based on the result corresponding to the attempt to perform the unauthorized write operation.

11. The non-transitory computer-readable memory device of claim 9, where the one or more policies include a plurality of policies, and
where the one or more instructions to cause the determination to be made as to whether the second device complies with the one or more policies include:
one or more instructions to send the first information and the second information to a plurality of devices; and
one or more instructions to cause the plurality of devices to determine, using the first information and the second information, whether the second device complies with the plurality of policies,
each device, of the plurality of devices, determining whether the second device complies with a respective policy of the plurality of policies.

12. The non-transitory computer-readable memory device of claim 11, where the plurality of devices are located remotely from the first device.

13. The non-transitory computer-readable memory device of claim 11, the instructions further comprising:
one or more instructions to determine that the result does not correspond to the authorized operation; and
one or more instructions to terminate operation of the plurality of devices.

14. The non-transitory computer-readable memory device of claim 9, where the second information includes information indicating that the second device is to be evaluated with respect to an antivirus policy, and
where the one or more instructions to cause the determination to be made as to whether the second device complies with the one or more policies include:
one or more instructions to cause an evaluation of the second device with respect to the antivirus policy to determine whether the second device complies with the antivirus policy.

15. The non-transitory computer-readable memory device of claim 14, where the one or more instructions to cause the determination to be made as to whether the second device complies with the one or more policies include:
one or more instructions to determine whether the second device is running software that meets particular criteria with respect to the antivirus policy.

16. The non-transitory computer-readable memory device of claim 14, where the one or more instructions to determine whether the second device is running the software that meets the particular criteria include:
one or more instructions to determine:
whether a revision level of the software corresponds to a particular revision level, or
whether a configuration of the software corresponds to a particular configuration.

17. A device comprising:
a memory to store instructions; and
a processor to execute one or more of the instructions to:
obtain information that identifies one or more policies relating to accessing a network;
send the information to one or more first devices to determine whether a second device complies with the one or more policies,
the one or more first devices being different from the device and the second device;
determine whether one or more results, of the one or more first devices determining whether the second device complies with the one or more policies, correspond to one or more authorized operations relating to the device;
send, to the second device, a message indicating that the second device is denied access to the network when the one or more results do not correspond to the one or more authorized operations; and
identify one or more resources, associated with the network, that the second device is allowed to access when the one or more results correspond to the one or more authorized operations.

18. The device of claim 17, where the processor is further to execute one or more of the instructions to:
determine, when the one or more results do not correspond to the one or more authorized operations, that the second device does not comply with the one or more policies; and
send, to the second device, information to bring the second device in compliance with the one or more policies after determining that the second device does not comply with the one or more policies.

19. The device of claim 17, where the processor is further to execute one or more of the instructions to:
send, to a third device, information relating to the second device accessing the one or more resources when the one or more results correspond to the one or more authorized operations,
the third device being different than the one or more first devices, and
the third device to determine whether to grant access to the one or more resources to the third device based on the information relating to the second device accessing the one or more resources.

20. The device of claim 17, where each first device, of the one or more first devices, determines whether the second device complies with a respective policy, of the plurality of policies, to produce a respective result of the one or more results,
where the processor is further to execute one or more of the instructions to:
determine that a particular result, of the one or more results, does not correspond to a particular authorization operation of the one or more authorized operations; and
terminate operation of a particular first device, of the one or more first devices, that produced the particular result.

* * * * *